United States Patent [19]
Valentini et al.

[11] 4,269,418
[45] May 26, 1981

[54] HYDRAULIC SEAL FOR FLUID MACHINES

[75] Inventors: Silvio Valentini; Mario Serafica, both of Genoa, Italy

[73] Assignee: Nira Nucleare Italiana Reattori Avanzati, Genoa, Italy

[21] Appl. No.: 117,630

[22] Filed: Feb. 1, 1980

[30] Foreign Application Priority Data
Feb. 7, 1979 [IT] Italy .................................. 12454 A/79

[51] Int. Cl.³ ............................................ F16J 15/40
[52] U.S. Cl. .................................... 277/14 V; 277/56; 277/135
[58] Field of Search ............. 277/56, 53, 14 R, 14 V, 277/135

[56] References Cited
U.S. PATENT DOCUMENTS

| 945,180 | 1/1910 | Ljungström | 277/56 |
| 2,510,130 | 6/1950 | Moore | 277/135 |
| 3,910,585 | 10/1975 | Tabacchi | 277/14 V |

FOREIGN PATENT DOCUMENTS
361458 11/1931 United Kingdom .................. 277/14 V Primary Examiner—Robert I. Smith
Attorney, Agent, or Firm—Robert E. Burns; Emmanuel J. Lobato; Bruce L. Adams

[57] ABSTRACT

A hydraulic seal for a fluid machine having a horizontal core and a vertical rotating shaft extending up through a central opening in the cover comprises a disc fixed on the shaft above the cover. A plurality of rotating frusto-conical sheaths have their smaller ends fixed to the disc and extending down almost to the cover. A plurality of stationary frusto-conical sheaths have their larger ends fixed to the cover and extend up almost to the disc, interleaving with the rotating disc. Spaces between the sheaths contain mercury and oil.

7 Claims, 1 Drawing Figure

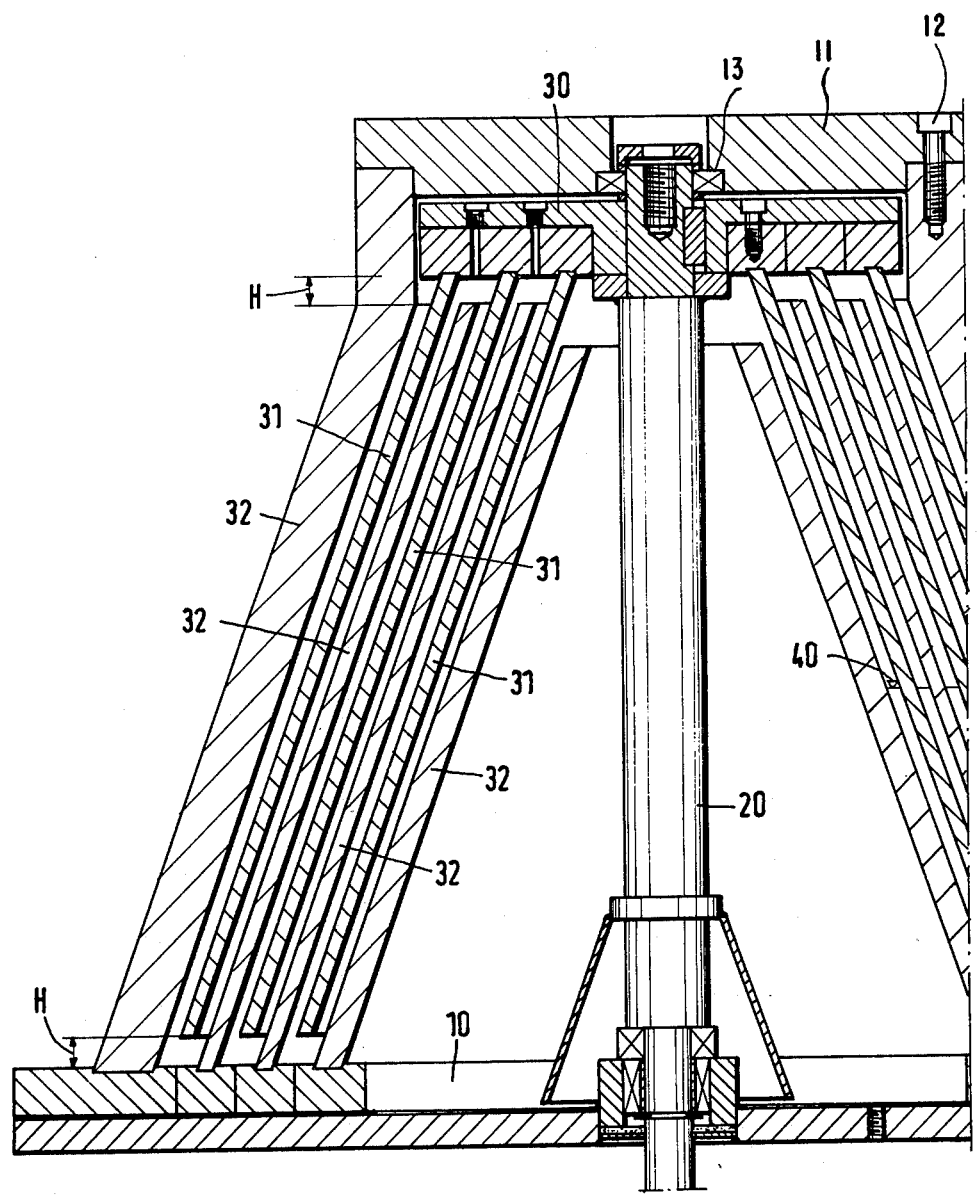

HYDRAULIC SEAL FOR FLUID MACHINES

BACKGROUND OF THE INVENTION

The seals at present available for industrial purposes can be subdivided, in terms of their functions, into two main classes:
 (a) Mechanical seals
 (b) Wet seals A more detailed description follows of the subdivisions within the two main classes.

Let us examine first of all the known mechanical seals:
 (a) Packing seals which can be:
  of the compression type (in which the seal is operated by compressing the packing with an external means);
  automatic (in which the seal is operated by using resilient elements which are positioned by the pressure of the same fluid which is to be restrained).
 This type includes V-cup, U-cup, piston-cup and o-ring seals.
  floating (which include the types known in industry as "PISTON-RING" and "SEGMENTAL ROD PACKING"). These types are normally mounted in grooves and are spring-compressed.
 (b) Seals with (radial or axial) play.

In this type the difference in pressure between the two ambient media is reduced by means of a loss in load which is effected across the aperture separating the moving part from the fixed part. These types have a rather high leakage rate.

Special means have been developed which make it possible to improve this type of seal and which are based on the increase in loss of load between the parts in relative motion by adopting labyrinths, fixed or floating bushing etc.

(c) Sliding frontal seals (properly known as "mechanical seals")

This type consists of two parallel-faced rings, one fixed and the other one rotating which can also be slid in an axial direction. Sealing is ensured by the direct contact between the two parts. The contact force is determined by the resultant of the forces acting upon the sliding ring (pressure, inert weight etc.) as well as by the forces due to a series of springs. This system provides for various constructional solutions depending on the specific applications and functional requirements.

Wet seals ensure a sealing effect by interposing a certain quantity of liquid between the two ambient media.

This interposition can be effected in two different ways, giving rise to two main solutions:
 (a) Static seals
 (b) Dynamic seals In the first case ("hydraulic guards") only the static head is used as the balancing element for the difference in pressure between the two ambient media.

In the second case the sealing effect is ensured by injecting fluid in the aperture between the fixed part and the moving part. Some special means are, of course, necessary in order to limit the leakage rate.

These seals include the systems known in commerce under the names VISCOSEAL, ISO CARBON SEAL (of the Elliot Company), SIDERVALL etc.

Independently of the type used, the basic requirements to be satisfied are as follows:

Sealing—within the entire operational field (temperature, pressure, speed of rotation);
Reliability—Possibility of checking the functioning of the individual parts and predicting their wear;
Maintenance—Ease of maintenance and repair and simplicity of design;
Length of operation—compatible with operational requirements;
Cost efficiency—of design and maintenance;
Autonomy—Low number of accessories or spare parts.

The observance of these requirements is all the more necessary both with the increase in the dangerous nature of the fluid treated and with the importance of the machine in the cycle in which it operates.

These problems are accentuated in particular in the nuclear field where leakage rates, however small, cannot be permitted and where any maintenance or repair work is carried out in special operating conditions.

In the light of the above, the need arises to find solutions to the difficulties encountered in seals of the known type, as described above.

In hydraulic seals the separation between the fluid and the external ambient medium is achieved by interposing a liquid with a total head counteracting the difference in pressure.

Until now, this system has been used for mainly static applications; in fact appreciable speeds of rotation would involve a partial dragging of the interposed fluid and hence an increase in the level to the point of overflow.

OBJECT OF THE INVENTION

As a result of this, a particular solution has been adopted in accordance with the invention, which makes it possible to contain the levels, even when they are subject to considerable speeds of rotation.

A type of seal has therefore been developed which is made up of a number of chambers in series, each consisting of a fixed part and a rotating part.

The number and dimensions of the chambers are functions of the differences in pressure between the two ambient media and of the specific dimensional requirements.

The walls which constitute the said chambers are inclined rather than vertical so as to avoid an increase in the levels due to the speed of rotation.

So as to obtain a homogeneous subdivision of the heads in the individual chambers, two fluids with different specific weights, i.e. mercury and mineral oil, all used.

The mercury produces the hydraulic head and has been chosen for its high specific weight, whereas the oil ensures the continuity of the variations in head in the individual chambers.

The behaviour of the said seal in static conditions and in dynamic conditions is characterized by a different arrangement of the free surfaces of the fluids.

The advantages of the invention are as follows:
 (a) Leakage rate reduced to zero;
 (b) Absence of direct contact between the fixed part and the rotating part and absence of wear;
 (c) Reliability as regards contamination of the sealing liquids and leakage of the same;
 (d) Practically unlimited life;
 (e) Does not require auxiliary lubricating circuits;
 (f) Does not require periodic maintenance;

(g) Is not affected by vibration or disalignmost of the shaft.

The field of application of the hydraulic seal according to the invention consists of rotating machines with a vertical axis, which require a leakage rate equal to zero. In particular and with respect to the immediate applications, reference is made to the following:
(a) Sodium pumps for fast reactors;
(b) processing pumps treating fluids with a high level of toxicity;
(c) machines for handling radioactive elements.

BRIEF DESCRIPTION OF THE DRAWINGS

The sole FIGURE shows a vertical axial section of a seal according to the invention.

DESCRIPTION OF A PREFERRED EMBODIMENT

In such a seal the upper cover 10 of the casing of a fluid machine, not shown in the FIGURE, is passed through by a shaft 20 which has at the top a disc 30 which is rigidly rotatable with the shaft 20. From the lower face of the disc 30 there protrudes downwards a series of frusto-conical sheaths 31 which at the top are rigid with the disc 30 and at the bottom extend to within a suitable distance (H) from the upper face of the cover 10. The frusto-conical sheaths 31 become wider from the top towards the bottom and have a parallel progression, i.e. their angle of aperture is substantially the same.

From the upper face of the cover 10 there protrudes upwards a second series of frusto-conical sheaths 32, not necessarily of the same thickness, which are inserted alternately between the sheaths of the first group 31 and which, moreover, surround the latter internally and externally. This means that the innermost and outermost sheath of the above-mentioned sheaths is always a sheath 32 of the abovementioned second series which is fixed.

The sheaths 32 of the second series, which are fixed, extend upwards as far as the lower face of the disc 30, and the distance which separates them from the latter is of the same order of magnitude as the distance (H) which separates the lower edge of the rotating sheaths 31 of the first series from the lower face of the cover 10.

A second cover 11 secured to the outermost of the sheaths 32, for example by screws 12 rotatably supports the upper end of the shaft by a bearing 13.

The sheaths 31 and 32 together, constitute a labyrinth seal which is filled to a suitable height by a sealing liquid.

The reference number 40, for example, indicates the level of such a sealing liquid. When the shaft 20, the disc 30 and the sheaths 31 are rotated, the sealing liquid is also made to rotate; however, according to the invention an undesired increase in the level of the sealing liquid cannot occur in view of the fact that the inclination of the sealing sheaths gives rise to a centrifugal component which tends to force the liquid downwards rather than upwards, as would happen if the sheaths 31 and 32 had vertical walls.

Furthermore, according to the invention, two liquids with very different densities, preferably mercury and oil, are used in place of a single sealing liquid; this makes it possible to split up the total head into partial heads of the same total height, thus permitting use of a seal of less axial height. In fact, with fairly considerable differences in pressure between the two ambient media, and with a single head, an unacceptable axial dimension would result.

Although for descriptive reasons the present invention has been based on that which has previously been described and illustrated merely by way of example with particular reference to the attached drawings, many modifications and variants can be made to the embodiment of the invention: such modifications and variants should neverthless be considered as based on the claims which follow.

What we claim is:

1. A hydraulic seal for a fluid machine having a horizontal cover and a vertical rotating shaft extending up through a central opening in said cover, said seal comprising:
   disc means fixed on and rotating with said shaft, said disc means being spaced upwardly from said cover,
   a plurality of rotating frusto-conical sheaths having smaller ends fixed to the lower side of said disc means and extending down almost to said cover, said rotating sheaths being coaxial with said shaft and being spaced apart one inside another,
   a plurality of stationary frusto-conical sheaths having larger ends fixed to the upper side of said cover and extending up almost to said disc means, said stationary sheaths comprising a sheath interposed between said rotary sheaths, an inner sheath inside the innermost rotating sheath and an outer sheath outside the outermost rotating sheath, and
   liquid filling spaces between said sheaths.

2. A hydraulic seal according to claim 1, in which said liquid comprises two liquids of very different densities.

3. A hydraulic seal according to claim 2, in which said liquid comprises mercury and oil.

4. A hydraulic seal according to claim 1, further comprising a second cover fixed to the upper end of said outermost stationary sheath and rotatably supporting the upper end of said shaft.

5. A hydraulic seal for a fluid machine having a horizontal cover and a vertical rotating shaft extending up through a central opening in said cover, said seal comprising:
   disc means fixed on and rotating with said shaft, said disc means being spaced upwardly from said cover,
   a plurality of stationary frusto-conical sheaths having larger ends fixed to the upper side of said cover and extending up almost to said disc means, said stationary frusto-conical sheaths being coaxial with said shaft and being spaced apart on inside another,
   a rotating frusto-conical sheath having its smaller end fixed to the lower side of said disc means and extending down almost to said cover, said rotating sheath being interposed between said stationary sheaths, and
   liquid filing spaces between said sheaths, said liquid comprising two liquids of very different densities.

6. A hydraulic seal according to claim 5, in which said liquid comprises mercury and oil.

7. A hydraulic seal according to claim 5, further comprising a second cover fixed to the upper end of the outermost stationary sheath and rotatably supporting the upper end of said shaft.

* * * * *